(12) United States Patent
Hatley et al.

(10) Patent No.: US 7,489,706 B2
(45) Date of Patent: Feb. 10, 2009

(54) METHOD AND APPARATUS FOR PLACING A TIMESTAMP IN A FRAME

(75) Inventors: William T. Hatley, San Jose, CA (US); Roy Liang Chua, Sunnyvale, CA (US)

(73) Assignee: Spirent Communications, Inc., Calabasas, CA (US)

( * ) Notice: Subject to any disclaimer, the term of this patent is extended or adjusted under 35 U.S.C. 154(b) by 1174 days.

(21) Appl. No.: 10/879,988

(22) Filed: Jun. 28, 2004

(65) Prior Publication Data

US 2005/0286564 A1 Dec. 29, 2005

(51) Int. Cl.
*H04J 3/06* (2006.01)
(52) U.S. Cl. .................... 370/469; 370/503
(58) Field of Classification Search .............. None
See application file for complete search history.

(56) References Cited

U.S. PATENT DOCUMENTS

| | | | | |
|---|---|---|---|---|
| 5,805,602 | A * | 9/1998 | Cloutier et al. | 370/516 |
| 6,512,882 | B1 * | 1/2003 | Teunissen | 386/70 |
| 7,039,070 | B2 * | 5/2006 | Kawakatsu | 370/503 |
| 7,397,825 | B2 * | 7/2008 | Woodward et al. | 370/516 |
| 2004/0208201 | A1 * | 10/2004 | Otake | 370/503 |
| 2006/0245311 | A1 * | 11/2006 | Thangaraj | 369/8 |

* cited by examiner

*Primary Examiner*—Firmin Backer
*Assistant Examiner*—Roberta A Shand
(74) *Attorney, Agent, or Firm*—Anthony T. Cascio

(57) ABSTRACT

Timestamp information can be placed in a frame that includes a first portion processable at a selected layer of a protocol stack and a second portion processable at a lower protocol layer of the protocol stack subsequently to the processing of the first portion, wherein the first portion is contained within the second portion and wherein a numerically computed error detection code for the second portion is computed during processing of the second portion. A timestamp signature having a timestamp subfield of initialized data and a corrector subfield of initialized data is embedded in the first portion during processing thereof at the selected protocol layer. A numerical constant functionally equivalent to the numerically computed error detection code is determinable from the initialized data in the timestamp subfield and the corrector subfield. The data in said timestamp subfield is modified with timestamp information subsequently to processing of the second portion at the lower protocol layer. The data in the corrector subfield is then modified such that the numerical constant as determinable from the modified data in the timestamp subfield and the corrector subfield remains unchanged, whereby the numerically computed error detection code computed at the lower protocol layer remains valid.

190 Claims, 1 Drawing Sheet

METHOD AND APPARATUS FOR PLACING A TIMESTAMP IN A FRAME

BACKGROUND OF THE INVENTION

1. Field of the Invention

The present invention is directed generally to the placing of a timestamp in a frame to be transmitted and, more particularly, in a portion of the frame that has been processed at a selected protocol layer of a protocol stack and also processed subsequently at another layer of the protocol stack whereat an error detection code for such portion is computed prior to placing the timestamp in such portion.

2. Description of the Related Art

In the monitoring, testing and maintenance of packet switched networks, it is necessary to measure accurately one or more measures of network latency, for example, the time it takes for a packet to traverse the network from its source to its destination. To measure this traversal time, various apparatus and methods have been developed in the prior art that share a basic concept of placing a timestamp, also referred to herein as timestamp information, into one or more packets to be transmitted into the network by a transmitting device and extracting such timestamp information from the packet at a receiving device. Using this basic concept various latency measurements of the network and also of associated devices under test within the network can be obtained.

According to this basic concept, timestamp information is obtained from a local clock or counter at the transmitting device and written into the packet prior to its transmission into the network. When the packet is received at the receiving device, timestamp information within the packet can be read and such information compared to received time information obtained from a local clock or counter at the receiving device. The difference between the received time information and the timestamp information conceptually reflects a static measure of the network latency between these two devices or network endpoints at a particular point in time.

However, since many networks, and especially the Internet, are continually carrying at any particular point in time packets for an indeterminate level of communication traffic, network latency measurements accordingly require timestamp containing packets to be transmitted continuously over a period of time, with the current timestamp information written into each packet, so that network latency data can be developed that has the broadest coverage and meaning in real time network traffic environments. In addition to timestamp containing packets sent from one endpoint to another, the timestamp containing packets can be transmitted and received from and to multiple endpoints, and at any of these endpoints further any device can act as both a transmitting and receiving device for itself or for other devices at other endpoints, such that the acquired latency data may provide a more complete dynamic overview of the network. For example, multiple point-to-point traversal and round trip transit times, latency through a specific node or device under test within the network, and other such parameters, and time variant changes thereto, can be obtained. Various types of test instruments for these endpoint devices are known in the prior art.

One requirement to ensure accuracy of the network latency measurement is that the clock or counter at the transmitting device must be synchronized with the corresponding clock or counter at the receiving device such that the difference between the time information derived from each device provides valid data. It is possible to synchronize the clocks or counters of two endpoint connected devices by operating them in lockstep or by first obtaining a known offset between them. In a network wherein the endpoints for the latency measurement are geographically diverse or wherein multiple endpoints are subject to the latency measurements, real time clocks in the endpoint devices may be synchronized using an accessible time service or network time protocol, as disclosed in Schulman, U.S. Pat. No. 5,600,632.

Another requirement to ensure accuracy of the network latency measurement is that the timestamp be written into the packet as near as possible to the time the transmitting device transmits such packet into the network. However, the functional specifications for the packet in which timestamp information is to be inserted, including the format and content of various fields therein required for compatibility with the networking framework of the network for which latency measurements are being obtained, are generally not amenable to the direct insertion of timestamp information into the packet upon its imminent transmission into the network.

The format and fields of any packet are defined by various protocols that a network connected device must be cognizant of to be able to interpret packets developed by another network connected device cognizant of the same protocols. Typically, the protocols are implemented as protocol layers of a hierarchical protocol stack. One of the commonly known networking frameworks for implementing protocols is the International Standard Organization's Open System Interconnection (ISO/OSI) model in which seven protocol layers in the hierarchical protocol stack have been defined as follows: Application (Layer 7), Presentation (Layer 6), Session (Layer 5), Transport (Layer 4), Network (Layer 3), Data Link (Layer 2) and Physical (Layer 1). Each of these layers is well know and a full description of each need not be set forth herein.

Exemplarily, in the generation of a packet at a transmitting device, wherein the packet is to contain user information to be transmitted over a network to a receiving device, the transmitting device passes control in its protocol stack from one protocol layer to the next, with processing of the packet starting at the top layer at which the user information is developed and proceeding successively through each lower layer to the bottom layer. Processing at each successively lower layer encapsulates the packet as processed by the previous layer typically by appending information to the packet in several formatted header fields. At the penultimate or lowest protocol layer, depending on the particular model of the protocol stack being used, the resultant packet as received from the previous layer is framed, converted into a bit stream and the frame transmitted into the network using the interface defined at the lowest layer. Generally the frame includes a data field that includes the resultant packet, a header prepended to the data field and a frame check sequence appended to the data field. The receiving device retrieves the user information from the frame by starting processing at the bottom layer of its corresponding protocol stack, processing successively back up through each layer of its the protocol stack wherein the header information added at each corresponding layer at the transmitting device is stripped from the packet, and processing ultimately the top layer whereat the received user information may be utilized.

Processing of a packet, which is to include timestamp information, at a present one of these protocols layers generally requires that timestamp information be contained within a data portion of the packet with the header exemplarily containing information of, inter alia, a numerically computed error detection code, such as a checksum, computed for the packet, including its data portion and header, at the present protocol layer. Since the error detection code cannot be computed until after the data portion has been generated, as well as any other header information, there is an inherent latency within the transmitting device between obtaining the timestamp information and encapsulating the packet at the present protocol layer. Furthermore, the timestamp information may have been required to be inserted into a data portion of the packet when being processed at a higher protocol layer, prior to the error detection code for the packet being computed at the present protocol layer, thereby resulting in yet greater latency between insertion of timestamp information into the packet and computation of the error detection code. Moreover, after processing at the present protocol layer, the packet may be subjected to further processing and encapsulation at one or more of lower protocol layers adding yet more latency prior to transmission of the frame containing this packet.

Therefore, the inherent latency within the transmitting device is indeterminate since it cannot be accurately determined due to unknown processing times at each of the protocol layers subsequent to inserting timestamp information into the packet and processor interrupts occurring during such processing. Accordingly, without any precise correction for the latency between obtaining the timestamp information and the actual time of transmission being possible, the network latency measurement, wherein a test instrument generates and transmits frames using timestamp containing packets as above described, timestamp information retrieved at a receiving test instrument inherently includes this indeterminate term and therefore does not accurately determine the true latency of the network.

In order to minimize the indeterminate latency within the transmitting device, Perches, U.S. Pat. No. 6,252,891, discloses a system and method to insert timestamp information into a packet by a test instrument in the form of a packet generator prior to transmission of the packet in a protocol neutral manner. As disclosed therein, an initial packet may be generated in a conventional manner at a particular protocol layer wherein the initial packet includes a network protocol portion and a payload portion. The payload portion contains several predefined fields and predetermined data within all except four of these fields wherein these four fields are initially empty. The four empty fields, which may be collectively referred to as a signature field, are each of a predetermined or reserved byte count. The network protocol portion contains a checksum computed for the initial packet from the data contained in the payload portion and other header information in the network protocol portion.

The initial packet is then processed by a test instrument that adds both a signature sequence and a transmit signature timestamp of appropriate byte count to their respective, but heretofore empty, predefined fields within the signature field reserved in the payload portion. In each successive packet generated by the test instrument, the signature sequence number is incremented for each successive packet starting with the initial sequence number obtained from the initial packet and the transmit signature timestamp for each successive packet is obtained from a local clock in the packet generator. Otherwise, all other fields in the payload portion and network protocol portion, including the pre-computed checksum, remain unchanged in each successive packet.

In order for the pre-computed checksum as computed in the initial packet to remain unchanged and valid for each successive packet after inclusion of the signature sequence number and transmit signature timestamp that change in each successive packet, the test instrument also adds a bit-by-bit inverse of the signature sequence number and a bit-by-bit inverse of the transmit signature timestamp to their respective predefined fields in the signature field. Accordingly, since the checksum of the signature sequence number and the transmit signature timestamp taken together with their respective inverses is zero, the pre-computed checksum in each successive packet remains valid irrespective of the insertion of the additional bytes into the signature field.

As described in the Perches reference, both of the signature sequence number and transmit signature timestamp, and their respective inverses, are inserted as binary information into their respective fields within the signature field during frame layer processing so that inherent latency between insertion of the timestamp and transmission of the frame is minimized. As long as the tests being performed by the transmitting device allow the insertion of the binary formatted signature field, the signature sequence number and transmit signature timestamp provide a convenient and accurate way for inserting timestamp information in the outgoing frames that can be retrieved by the receiving device, and thus allow computation of the latencies imposed by the network. Accordingly, the apparatus and methods disclosed in the Perches reference work well for the testing of Layer 2 and Layer 3 devices, and may possibly be used in some Layer 4 testing.

However, when testing higher layer protocols, and devices that are sensitive to those protocols, the insertion of the binary formatted fields is not generally viable. For example, the message portion for a packet processed at a Layer 7 protocol, such as the HTTP protocol, consists entirely of ASCII strings. Insertion of a binary-formatted field within this Layer 7 message portion would corrupt the HTTP messages, resulting in a high probability that the HTTP message would be dropped by devices under test that are cognizant of the HTTP protocol and need to interpret the HTTP messages during Layer 7 processing upon receipt.

It is known to embed an ASCII string containing timestamp information within ASCII messages developed by a Layer 7 application wherein timestamp information is obtained during Layer 7 processing. For Layer 7 protocols, such as HTTP, FTP and SMTP, among others, there are four known techniques to embed ASCII timestamp information during Layer 7 processing. The first technique embeds the ASCII timestamp information within a data portion of the packet processed at the Layer 7 protocol. This data portion is conventionally handled and tolerated by devices cognizant of Layer 7 in the network. The second tecnique involves embedding timestamp information in ASCII text descriptions (human readable) of Layer 7 protocol responses. The third technique involves embedding timestamp information into the Layer 7 protocol request fields, such as sub-domain names in DNS. The fourth technique uses extra headers or modifies existing headers within the Layer 7 protocol in such a manner to include timestamp information as to not change the operation and behavior of devices cognizant of the Layer 7 protocol in the network.

However, one significant disadvantage and limitation of each of these four techniques of embedding the ASCII timestamp during Layer 7 processing is that timestamp information must be inserted by the Layer 7 application in the test instrument, or transmitting device, into the ASCII message portion of the packet prior to passing the message to the next lower layer in the protocol stack and ultimately to the Layer 2 process that frames the resultant packet and transmits such frame. As described generally above, there can be a significant, indeterminate and uncontrolled latency in the protocol stack of the transmitting device from the time the timestamp is inserted during Layer 7 processing and the time the frame actually exits the test instrument. This test instrument latency, for example on the order of 10 ms, can be significant in terms of the link speed or of total network traversal time, and can thus render the latency measurements that are being attempted as unreliable or even meaningless.

Another significant disadvantage and limitation of each of these four techniques of embedding the ASCII timestamp during Layer 7 processing is that timestamp information is obtained prior to calculation of the Layer 4 checksum for the Layer 4 header that encapsulates the packet. Also as generally described above, since timestamp information is inserted during Layer 7 processing prior to the Layer 4 checksum being calculated, there is yet a further indeterminate latency within the test instrument.

Accordingly, there exists a need to provide a method and apparatus that can place timestamp information into a portion of a frame during frame layer processing wherein timestamp information is embedded into such portion subsequently to processing of such portion at an upper protocol layer and further subsequently to the computation of an error detection code for the packet including such portion at a lower protocol layer. There exists a further need to provide such method and apparatus wherein as many such frames as possible are capable of being transmitted continuously over a period of time, with the current timestamp information placed into each frame, such that upper layer latency measurements provide the broadest coverage and meaning in real time network traffic environments. There exists yet a further need to provide such method and apparatus wherein the frame includes timestamp information in the Layer 7 message portion.

SUMMARY OF THE INVENTION

Accordingly, it is a primary object of the present invention to provide a method and apparatus that can place timestamp information into a portion of a frame during frame layer processing wherein timestamp information is embedded into such portion subsequently to processing of such portion at an upper protocol layer and further subsequently to the computation of an error detection code for the packet including such portion at a lower protocol layer. It is a further object of the present invention to provide such method and apparatus wherein as many such frames as possible are capable of being transmitted continuously over a period of time, with the current timestamp information placed into each frame, such that upper layer latency measurements provide the broadest coverage and meaning in real time network traffic environments. It is a yet a further object of the present invention to provide such method and apparatus wherein the frame includes timestamp information in the Layer 7 message portion.

According to the present invention, timestamp information can be placed in a frame that includes a first portion processable at a selected layer of a protocol stack and a second portion processable at a lower protocol layer of the protocol stack subsequently to the processing of the first portion, wherein the first portion is contained within the second portion and also wherein a numerically computed error detection code for the second portion is computed during processing of the second portion. A timestamp signature having a timestamp subfield of initialized data and a corrector subfield of initialized data is embedded in the first portion during processing thereof at the selected protocol layer. A numerical constant functionally equivalent to the numerically computed error detection code is determinable from the initialized data in the timestamp subfield and the corrector subfield. The data in the timestamp subfield is modified with timestamp information subsequently to processing of the first portion at the selected protocol layer and of the second portion at the lower protocol layer. The data in the corrector subfield is then modified such that the numerical constant as determinable from the modified data in the timestamp subfield and the corrector subfield remains unchanged, whereby the numerically computed error detection code computed at the lower protocol layer remains valid.

A feature of the present invention is that the timestamp signature is embedded with initialized data during processing at an upper protocol layer so that processing at a lower protocol layer, whereat the error detection code is computed, can be performed using normal protocol specifications, procedures and formats. This feature advantageously allows packets to be processed normally through all protocol layers up to the time timestamp information is placed into the frame during frame layer processing obviating any degradation of the ability of a test instrument to develop a sufficient number or transmission rate of timestamp containing packets.

Another feature of the present invention is that the initialized data within the timestamp subfield of the timestamp signature can be modified with timestamp information during frame layer processing subsequently to processing at the upper and lower protocol layers and any other protocol layer at which processing occurs prior to modification of the initialized data. This feature advantageously allows processing of a timestamp containing packet to occur over several protocol layers without the inherent latency of processing times for these layers being included into the timestamp information. In one particular aspect of the present invention, the modification may occur upon imminent transmission of the frame such that any inherent latency is advantageously highly deterministic, and therefore easily correctable or compensated for, or even negligible in the context of the latency measurements to be obtained.

Yet another feature of the present invention is that the timestamp signature includes a readily modifiable corrector subfield to ensure that the error detection code computed during processing of the packet at the lower protocol layer remains valid by ensuring that a functionally equivalent constant determinable from the initialized data in the first and corrector subfields and the modified data in each of these subfields remains unchanged after modification. For example, in one aspect of the present invention, the modification of the data in the corrector subfield can be accomplished by obtaining the data for this subfield from a lookup table, thereby advantageously eliminating any further processing to compute such modified data, thereby further minimizing inherent latency between placing of the timestamp and transmission of the frame.

These and other objects, advantages and features of the present invention will become readily apparent to those skilled in the art form a study of the following Description of the Exemplary Preferred Embodiments when read in conjunction with the attached Drawing and appended claims.

DESCRIPTION OF THE EXEMPLARY PREFERRED EMBODIMENTS

Figure 1:
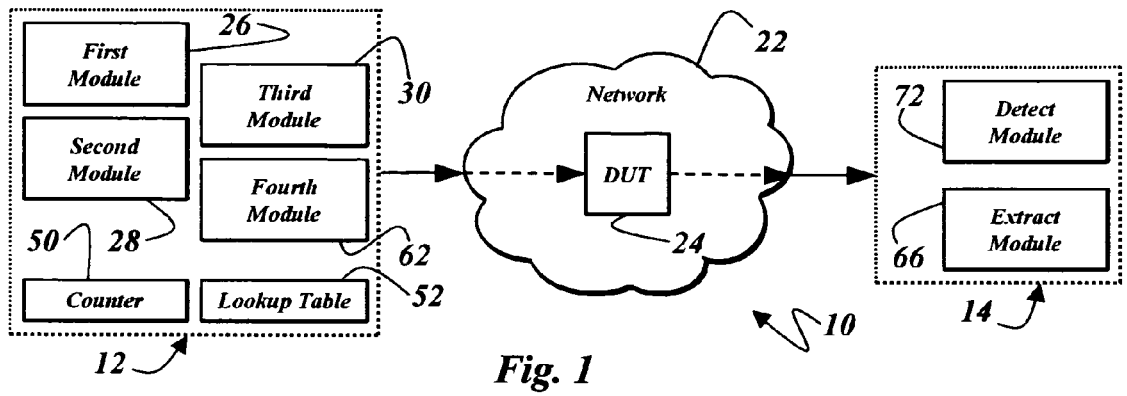
FIG. 1 is a schematic diagram of a system in which apparatus constructed according to the principles present invention may be used.
Figure 2:
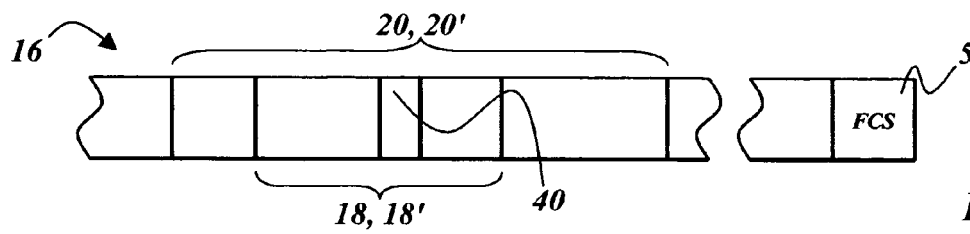
FIG. 2 is a fragmentary view of a bit stream of a frame for the system of FIG. 1.

Referring now to FIG. 1, there is shown a system 10 including a transmitting device 12 and a receiving device 14. With further reference to FIG. 2, the transmitting device 12 is operable in a conventional and known manner to process and transmit frames, such as frame 16, and the receiving device 14 is operable to receive and process such frames, also in a conventional and known manner.

Exemplarily as described above, such frames result from processing information at each protocol layer of a protocol stack in the transmitting device 12. For example, the frame 16 includes a first portion 18 and a second portion 20, wherein the first portion 18 is contained within the second portion 20. The first portion 18 is processable at a selected protocol layer of the protocol stack. The second portion 20 is processable at a lower protocol layer of the protocol stack subsequently to the processing of the first portion 18. The processing of the second portion 20 may exemplarily include the encapsulation of the first portion 18. During processing of the second portion, an error detection code is computed for the second portion 20.

Also as exemplarily described above, when the transmitting device 12 and the receiving device 14 are test instruments used to measure any one of the typically measured network latencies in the system 10, such as a traversal time of the frame 16 between the transmitting device 12 and the receiving device 14 through a network 22 or a latency through a device 24 under test, timestamp information is placed into the frame at the transmitting device 12 so that the receiving device 14 can utilize this timestamp information or data. The present invention, as described below, is directed to the methods and apparatus to place timestamp information into the frame 16 that meet the stated objects of the present invention.

According to the present invention, an apparatus to place timestamp information into the frame 16 includes a first module 26, a second module 28 and a third module 30, as best seen in FIG. 1. Any of these modules may be implemented in hardware, firmware or software within the transmitting device 12. Accordingly, any such modules as herein described can be described in accordance with the steps of a method that each module is operable to implement.

Figure 3:
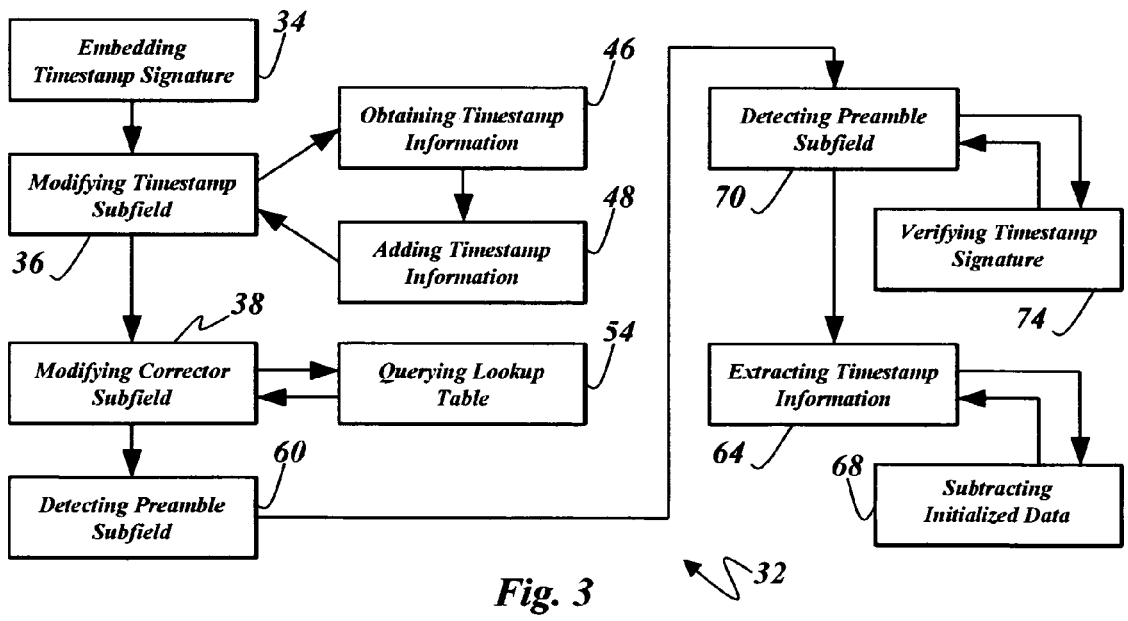
FIG. 3 is a flowchart of methods practiced in accordance with the principles of the present invention.

With further reference to FIG. 3, there is shown the method steps in a flowchart 32 including an embedding step 34, a timestamp subfield modifying step 36 and a corrector subfield modifying step 38. The embedding step 34, the timestamp subfield modifying step 36 and the corrector subfield modifying step 38 are the steps of the method implemented respectively by the first module 26, the second module 28 and the third module 30 in the transmitting device 12.

Figure 4:
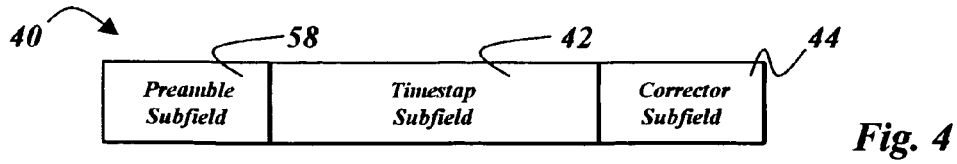
FIG. 4 is a detail of the timestamp signature of FIG. 2.

With further reference to FIG. 4, a timestamp signature 40, in accordance with the embedding step 34, is embedded in the first portion 18 of the frame 16, as best seen in FIG. 1, during processing thereof at the selected protocol layer. The timestamp signature 40 has a timestamp subfield 42 of initialized data and a corrector subfield 44 of initialized data. From the initialized data in the timestamp subfield 42 and the corrector subfield 44 a numerical constant that is functionally equivalent to the numerically computed error detection code is determinable. In practicing the present invention the numerical constant need not be computed.

In accordance with the timestamp subfield modifying step 36, the initialized data in the timestamp subfield 42 of the timestamp signature 40 is modified with timestamp information thereby resulting in modified data in the timestamp subfield 42. The timestamp subfield modifying step 36 is performed subsequently to processing of each of the first portion 18 of the frame 16 at the selected protocol layer and the second portion 20 of the frame 16 at the lower protocol layer.

In accordance with the corrector subfield modifying step 38, the initialized data in the corrector subfield 44 is modified thereby resulting in modified data in the corrector subfield 44.

The corrector subfield modifying step 38 is performed subsequently to performance of the timestamp subfield modifying step 36. In particular, the modification of the data in the corrector subfield 44 is performed such that the above described numerical constant, as it would be determinable from the modified data in the timestamp subfield 42 and the corrector subfield 44, remains unchanged.

The functional equivalency of the numerical constant to the error detection code assures that the error detection code previously computed during processing at the lower protocol layer remains valid after the modification of data in each of the timestamp subfield 42 and the corrector subfield 44. For example, in one embodiment of the present invention, the error detection code may be a checksum conventionally computed for the second portion 20 of the frame 16. The functional equivalency of the numerical constant would then be a checksum determinable from the data in the timestamp subfield 42 and the corrector subfield 44. The modified data in the corrector subfield 44 may then be readily determined such that the checksum of the timestamp subfield 42 and the corrector subfield 44 does not change between the initialized data and the modified data in each of these fields. Since the checksum of the timestamp subfield 42 and the corrector subfield 44 remains constant, it is then apparent to those skilled in the art that the checksum previously computed during processing at the lower protocol layer for the second portion 20, which having encapsulated the first portion 18 that contains the timestamp signature 40 with the modified data in the timestamp subfield 42 and the corrector subfield 44, also remains unchanged and valid.

Modification to the initialized data in the timestamp subfield 42 that results in the modified data in the timestamp subfield 42, subject to the constraint imposed by the numerical constant, has an advantageous result that the modified data for the corrector subfield 44 can be readily determined to minimize any inherent latency between modifying the timestamp subfield 42 with timestamp information and the transmission of the frame 16 from the transmitting device 12, and not involve time consuming processing to derive the modified data in the corrector subfield 44 in the transmitting device 12 that would otherwise increase such latency. It is readily seen that for each modification to the initialized data in the timestamp subfield 42 with timestamp information, there is a corresponding modification to the initialized data in the corrector subfield 44 that would need to occur so that the resultant modified data in the corrector subfield 44 maintains the constancy of the numerical constant. Accordingly, knowing all possible modifications to the initialized data in the timestamp subfield 42, a finite set of modified data for the corrector subfield 44 can be developed.

In one particular embodiment of the present invention, the corresponding modification may in turn also be one of a finite set of such corresponding modifications. In such embodiment, the timestamp subfield modifying 36 step may include an obtaining step 46 and adding step 48, each of which the second module 28 can be further operable to implement. In accordance with the obtaining step 46 a binary form of the timestamp information is obtained from a timestamp counter 50 (FIG. 1) in the transmitting device 10, and further in accordance with the adding step 48 the binary timestamp information is added to a binary form of the initialized data in the timestamp subfield 42. The modified data in the timestamp subfield 42 is resultant from the adding step 48.

Since the counter 50 may typically be an n-bit wide counter, there is a finite set of timestamp information that may be obtained therefrom. Thus, for each modification to the initialized data in the timestamp subfield 42 with the finite set of timestamp information, there will be a finite set of modified data for the corrector subfield 44 that will satisfy the constraint of the numerical constant remaining unchanged. This finite set can even be further reduced wherein each set of four bits of the binary form of the timestamp information is summed with a corresponding set of four bits of the binary form of the initialized data in the timestamp subfield 42 by the adding step 48.

From the example set forth above in this particular embodiment of the present invention, it is apparent that the modified data for the corrector subfield 44 may be placed within a lookup table 52 (FIG. 1) in the transmitting device 12, wherein each entry of the modified data for the corrector subfield 44 is cross referenced to each possible result for the modified data in the timestamp subfield 42, irrespective of the method or apparatus used to obtain the modified data in the timestamp subfield 42. Accordingly, the corrector subfield modifying step 38 may further include a querying step 54, which the third module 30 can be further operable to implement. In accordance with the querying step 54, the lookup table 52 is queried using the modified data in the timestamp subfield 42 as the querying or search parameter to obtain the modified data for the corrector subfield 44.

The timestamp subfield modifying step 36 and the corrector subfield modifying step 38 are performed during frame layer processing of the frame 16 and preferably upon imminent transmission of the frame 16 by the transmission device 12, thereby minimizing any inherent latency within the timestamp information. In some protocols, at frame layer processing, a frame check sequence 56, as best seen in FIG. 2, is appended to the frame 16. The frame check sequence 56 can be conventionally determined, as is known in the art, from a computation performed on the bit stream of the frame 16 as the frame 16 is being emitted.

The latency between the timestamp subfield modifying step 36 and the corrector subfield modifying step 38 being performed and the frame check sequence 56 being appended is extremely small and highly deterministic, such that such latency can be calibrated into the timestamp information, or otherwise accounted for at the receiving device 14. For example, if a 100 mHz clock is used for the counter 50, the inherent latency between the timestamp information being obtained and the frame check sequence 56 being appended, i.e., the resolution of the timestamp, may be in the order of 10 ns, which is sufficient resolution to support link speeds up to 10 Gb as is common in Ethernet links. Generally, the clock rate for the counter 50 is selected to be as high as practical for the link speed under test.

In another embodiment of the present invention, the timestamp signature 40 may further include a preamble subfield 58, as best seen in FIG. 4, of predetermined data to identify the timestamp signature 40 in the first portion 18 of the frame 16. The predetermined data may be hardwired, predefined in software, or obtained from a RAM lookup process. The preamble subfield 58 may be used as necessary whenever the data in timestamp signature 40 is to be made subject to any processing.

For example, in further embodiment of the present invention, the flowchart 32 may further including a detecting step 60, as best seen in FIG. 3, which a fourth module 62 in the transmitting device 12 may further be operable to implement. In accordance with the detecting step 60, the predetermined data in the preamble subfield 58 is detected in the bit stream of the frame 16 to locate the timestamp subfield 42. Preferably, such detection is performed upon imminent transmission of the frame 16. In any event, each of the timestamp subfield modifying step 36 and the corrector subfield modifying step 38 are then performed upon detection of the predetermined data in the preamble subfield 58.

As set forth above, the receiving device 14, at which any measure of network latency may be obtained in a known or conventional manner, may utilize the timestamp information in the frame 16. For example, the timestamp information may be used with the received time of the frame 16 at the receiving device 14. To utilize the timestamp information, in another embodiment of the present invention, the flowchart 32 may further include an extracting step 64 as best seen in FIG. 3, which an extract module 66, as best seen in FIG. 1, in the receiving device 14 can be operable to implement.

In accordance with the extracting step 64, the timestamp information is extracted from the received frame 16 by removing from the modified data in the timestamp subfield 42 an influence of the initialized data originally as in the timestamp subfield 42. The extracting step 64 can be performed upon receipt of the frame 16 at the receiving device 14 or during processing of the first portion 18 of the frame 16 at the selected protocol layer in a corresponding protocol stack in the receiving device 14.

The extracting step 64 may include, in anther embodiment of the present invention, a subtracting step 68, which the extract module 66 may further be operable to implement. In accordance with the subtracting step 68, a binary form of the initialized data originally as in the timestamp subfield 42 is subtracted from the modified data in the timestamp subfield 42. The extracted timestamp information is resultant of the subtracting step 68. The subtracting step 68 is performed using the same characterization of the data as used the adding step 48, described above, such that if sets of four bits were used in the adding step 48, in the subtracting step 68, each set of four bits of the initialized data originally as in the timestamp subfield 42 is subtracted from each set of four bits in the modified data in the timestamp subfield 42.

When the timestamp signature 40 includes the preamble subfield 58 the flowchart 32, in another embodiment of the present invention, may further include a detecting step 70, as best seen in FIG. 3, which a detect module 72, as best seen in FIG. 1, in the receiving device 14 can be operable to implement. In accordance with the detecting step 70, the predetermined data in the preamble subfield 58 is detected, such that the timestamp signature 40 in the received frame 16 is identified and the timestamp subfield 42 located so that the data therein may be read.

The detecting step 70 may be performed either as the bit stream of the frame 16 is being received at the receiving device 14, or during processing of the first portion 18 of the frame 16 at the selected protocol layer in the corresponding protocol stack in the receiving device 14. In either event, the extracting step 64 is performed subsequently to the detecting step 70.

The detecting step may further include a verifying step 74, which the detect module 72 may be further operable to implement. In accordance with the verifying step, the timestamp signature may be verified as containing valid data from an actual computation of the numerical constant, described above, from the modified data in each of the timestamp subfield 42 and the corrector subfield 44. Performance of the extracting step 64 may be made conditional upon the results of the verifying step 74.

The various embodiments of the methods and apparatus of the present invention described above are particularly useful for obtaining latency measurements during Layer 7 testing or for devices cognizant of the Layer 7 protocol. In such event, the selected protocol layer and the lower protocol layer are the application layer (Layer 7) and the transport layer (Layer 4), respectively, of the ISO/OSI model protocol stack. Accordingly the first portion 18 and the second portion 20 of the frame 16 may respectively be an ASCII message portion 18' and a transport layer portion 20', wherein the transport layer 20' includes the encapsulated packet from the prior protocol layer inclusive of the transport layer header and payload. Moreover, in the timestamp signature 40, the preamble subfield 58 may contain a string of predetermined ASCII characters for the predetermined data therein, the timestamp subfield 42 may contain a string of initialized ASCII characters and the corrector subfield 44 may also contain a string of initialized ASCII characters for the initialized data in each of these subfields. Preferably, all of the ASCII characters in the timestamp signature 40 may be selected from the base64 alphabet characters a-z, A-Z, 0-9, (+), (−), and (=), as defined in RFC 3548.

In a further embodiment of the present invention, each of predetermined ASCII characters in the preamble subfield 58 may be a differing unique one of the ASCII characters. By having each character appear only once in the string in the preamble subfield 58, detection of this string, as described generally above, is facilitated. Moreover, the length of the string is selected to mitigate unintentional coincidence with any other character string in the ASCII message portion 18'. A particular example for the string may have a length of twenty bytes and the unique characters selected so that the string in the preamble subfield 58 appears as aAzZbByYcCxX1d2W3E4v in the timestamp signature 40.

In other further embodiments of the present invention, each of the initialized ASCII characters in the timestamp subfield 42 is an identical one of the ASCII characters. The string in the timestamp subfield 42 may further have a length selected commensurately with the width of the n-bit wide counter 50 from which the timestamp information is obtained. When the same character is used for each of the initialized characters in the timestamp subfield 42, modification of these characters is facilitated as is the modification of the initialized characters in the corrector subfield 44, as will become apparent below.

For example, the timestamp subfield 42 may contain AAAAAAAAAA as its string of initialized ASCII characters. Since this string has a length of ten bytes, the bit width of the counter 50 may be 40 bits, thereby allowing a forty bit resolution of the timestamp. For this example, each set of four bits from the counter 50 is summed, in accordance with the adding step 48, with each four bits of the binary form of each one of the ASCII characters in the ten byte string. In particular, the lowest set of four bits from the counter 50 is added to the four bits from the rightmost character in the ten byte string, and proceeding for the next higher set of four bits and next character to the left until the highest set of four bits is added to the four bits of the binary form of the leftmost character. After performance of the adding step 48, each of the modified characters in the timestamp subfield 42, for this example, will belong to the set ABCDEFGHIJKLMNOP.

Continuing with this particular example, each of the initial ASCII characters in the corrector subfield 44 may also be an identical one of the ASCII characters. The string in the corrector subfield 44 may further have an initial length selected so that the initial length stays constant and further so that the characters therein stay within the base64 alphabet. Exemplarily, the corrector subfield may contain a four byte string of zzzz as its string of initialized characters.

Similarly as generally described above, the modification to the initialized characters in the corrector subfield 44 must be performed such that the checksum in the transport layer portion 20' remains valid subsequent to the modification of the initialized characters in each of the timestamp subfield 42 and the corrector subfield 44. The above described numerical constant, in this example, may then be determinable, as the sum of the binary value of the characters in the timestamp subfield 42 and the corrector subfield 44.

Since the checksum in the transport layer portion 20' is typically computed sixteen bits at a time using ones-complement arithmetic, the sum determinable for the numerical constant in this example would require that the ASCII characters need to be summed two characters at a time. It should be noted that an accumulator (not shown) sufficiently wide to capture all carries into bit positions higher than the sixteen bit values being summed may be needed. Furthermore, as is known, the carries in the accumulator are added back to the sum in the checksum algorithm.

For this particular example, the numerical constant, as determinable form the initialized ASCII characters in the timestamp subfield 42 and the corrector subfield 44, using two characters at a time, may be shown as follows:

| Character Representation | Hexadecimal numeric representation |
| --- | --- |
| AA | 0x4141 |
| AA | 0x4141 |
| AA | 0x4141 |
| AA | 0x4141 |
| AA | 0x4141 |
| zz | 0x7A7A |
| zz | +0x7A7A |
|  | 0x23B39 |

Accordingly, the checksum in the transport layer 20' will remain valid if the modified ASCII characters in the timestamp subfield 42 and the corrector subfield 44 can produce the same exemplary value of 0x23b39.

Further to this example, the value for each of the modified characters in the timestamp subfield 42 can at most differ from their initial value by a difference of fifteen. Since there are five characters in each of the two columns being added above, the maximum value by which the sum of the ten characters of the timestamp subfield 42 can increase is 5×15=75 for the characters in either column of the sum.

If the value of one of the 'z' characters in the corrector subfield 44 is changed to 'a', the sum of all characters in that column is reduced by twenty five. If the value is changed to 'A', the sum is reduced by fifty seven. Since there are two characters of the corrector subfield 44 in each of the columns being summed, modification of the corrector subfield 44 can reduce the sum for that column as given by the expression 57*2=114. This is more than enough to compensate for the maximum addition of fifty seven to each column.

Also as described generally above, it is further apparent form this example that a (non-unique) mapping exists for modifying the two characters for the corrector subfield 44 in each column above to compensate for all possible modifications to the ASCII characters in the timestamp subfield 42, and thus ensure that the overall checksum in the transport layer 20' remains valid and is not corrupted.

Using the above exemplary strings initially contained in the preamble subfield 58, the timestamp subfield 42 and the corrector subfield 44, the timestamp signature 40 as embedded in the ASCII message portion 18' during Layer 7 processing would appear as aAzZbByYcCxX1d2W3E4vAAAAAAAAAAzzzz. During Layer 2 processing, generally referred to above as frame layer processing, as the first byte of the frame 16 is moved by the hardware link access the current timestamp information, for purposes of this example represented as 0x123456789A, may be obtained by the second module 28 operable in accordance with the obtaining step 46 and then latched.

The fourth module 62, operable in accordance with the detecting step 60, recognizes the preamble string aAzZbByYcCxX1d2W3E4v in the preamble subfield 58 and the second module 28 operable in accordance with the timestamp subfield modifying step 36 and the third module 30 operable in accordance with the corrector subfield modifying step 38 modify the next fourteen characters of the timestamp subfield 40. The first ten of these characters, being in the timestamp subfield 42, are modified by the second module 28, which is operable to add the appropriate bits from the 40-bit wide latched timestamp value, and the remaining four characters, being in the corrector subfield 44, are modified by the third module 30 to preserve the checksum.

In this example, the timestamp signature 40 after the above modifications and as it to transmitted in the frame 16 appears as aAzZbByYcCxX1d2W3E4vBCDEFGHIJKaazu. It is apparent that the numerical constant, being a sum of the characters in the timestamp subfield 42 and corrector subfield 44 as described, remains unchanged as follows:

| Character representation | hexadecimal numeric representation |
|---|---|
| BC | 0x4243 |
| DE | 0x4445 |
| FG | 0x4647 |
| HI | 0x4849 |
| JK | 0x4A4B |
| aa | 0x6161 |
| zu | +0x7A75 |
| | 0x23B39 |

Therefore, even though the second module 28 and the third module 30 were operable to modify these fourteen characters in timestamp signature 40, the overall checksum in the transport portion 20' is preserved.

At the receiving device 14, the preamble subfield 58 can be detected (either in hardware or software) by the detect module 72 to locate the timestamp signature 40 as described in accordance with the detecting step 70. As an additional indication of a valid timestamp signature 40 being received, the detect module 72 further operable to implement the verifying step 74 may sum the next fourteen characters of the timestamp subfield 42 and the corrector subfield 44 two at a time as described above. If the sum is 0x23B39, then the timestamp signature 40 is valid, otherwise it may be discarded or ignored.

The individual characters in the received timestamp subfield 42 will have the original initialized value of 'A' subtracted from them by the extract module 66 when further operable to implement the subtracting step 68 to get four bits of the binary value for each character therein. Each of these four bits may then be assembled into the exact value that had been latched from the timestamp counter 50 and used as the timestamp information to modify the characters in the timestamp subfield upon imminent transmission of the frame 16.

The network 22, when exemplarily representative of the Internet, is known to be an interconnected set of networks. Any one of these networks may only allow a maximum packet size smaller than the size of a datagram encapsulated during Layer 2 processing in the transmitting device 12. To traverse such networks, the frame 16 as transmitted is subsequently fragmented into multiple fragments within the network 22, for example during processing at the internet protocol (IP) layer (Layer 3) module in a gateway (not shown) in one of interconnected networks. Each of these fragments is then received at the receiving device 14 where they are assembled to recover the original datagram.

More specifically, during Layer 3 processing at the gateway, the original datagram is fragmented into two or more new datagrams, wherein each new datagram or fragment, includes the Layer 3 header of the original datagram. The Layer 3 header in each new datagram also includes the identification of the original datagram to which it belongs plus the offset, i.e., its position within the original datagram. Since fragmentation is done at Layer 3, either of both of the ASCII message portion 18' and transport layer portion 20' may be fragmented among multiple fragments. Accordingly, each of the new datagrams needs to be reassembled into the original datagram at the receiving device 14 prior to the extract module 66 implementing the extracting step 64.

Assembly occurs during processing of the new datagrams at the internet protocol in the receiving device, using the identification and offset fields of the Layer 3 header, such that the original datagram can be faithfully reassembled with the ASCII message portion 18' and transport layer portion 20' intact. The extracting step 64 may then be performed, as hereinabove described, either during processing at the IP layer or at the application layer.

The received time information may then be taken as the time the last of the fragments is received at the receiving device 14. Alternatively, the received time could be calculated as a function of the received time of each of the fragments of the original datagram There are multiple layer 7 protocols that can have the timestamp signature 40 as above described embedded therein, and in many of these there are multiple places, any of which are within the definition of the ASCII message portion 18', within the standard upper layer messages where the timestamp signature 40 can be embedded. Following are several examples of Layer 7 protocols and appropriate locations for embedding the timestamp signature 40, using the characters as described in the example above for identification purposes. It is to be understood that this list, while comprehensive, is not exhaustive.

In an HTTP Request, the HTTP protocol allows the insertion of an arbitrary header, beginning with the characters "x-" as an indicia character. The timestamp signature 40 may be embedded within the arbitrary header. Preferably, the timestamp signature 40 would be embedded as part of the URL:

http://www.xxx.com/page/
   aAzZbByYcCxX1d2W3E4vAAAAAAAAAAA
   zzzz.html or, alternatively, in the User-Agent header, exemplarily as
User-Agent: Mozilla/5.001 (windows; U; NT4.0; en-us) Gecko/
   aAzZbByYcCxX1d2W3E4vAAAAAAAAAAzzzz when devices under test, such as device 24, are present since this header generally is passed through such devices.

In HTTP Posts, the timestamp signature 40 may be embedded inside the variable name for URL-encoded posts. For multi-part MIME-encoded posts, the timestamp signature 40 may be embedded inside the base64 portion that is part of that message.

In HTTP responses, the timestamp signature 40 can be embedded within the response itself, as shown in the following example:

```
<HTML>
<HEAD/>
<BODY>
   aAzZbByYcCxX1d2W3E4vAAAAAAAAAAzzzz
   aAzZbByYcCxX1d2W3E4vAAAAAAAAAAzzzz
   aAzZbByYcCxX1d2W3E4vAAAAAAAAAAzzzz
</BODY>
</HTML>
```

To prevent compression of the response, the Accept-Encoding header should not be used in the request.

For the FTP protocol, in control connections, the timestamp signature 40 may be embedded in a file name for a FTP get or put. In response, the timestamp signature 40 may be embedded in the ASCII string that goes with each numeric status code as follows:

200 OK–aAzZbByYcCxX1d2W3E4vAAAAAAAAAA zzzz.

In the data connection, the timestamp signature 40 may be embedded in the transferred data.

For the SMTP protocol, in a MAIL FROM message, the timestamp signature 40 may be embedded as part of the user-name, although the domain name should probably not be used for embedding, as follows:

MAIL FROM: aAzZbByYcCxX1d2W3E4vAAAAAAAAAAzzzz @abc.com.

The timestamp signature 40 may also be embedded in a RCPT TO message, provided any device 24 under test does not perform a user-name check, as follows:

RCPT TO: aAzZbByYcCxX1d2W3E4vAAAAAAAAAAzzzz @yz.com.

For timestamps coming the other way, the timestamp signature 40 may be embedded in the ASCII string after the numeric return code, just as in FTP, as follows:

250 OK aAzZbByYcCxX1d2W3E4vAAAAAAAAAAzzzz.

For the POP3 protocol, the timestamp signature 40 may be embedded similar to the SMTP protocol, with timestamps further hidden for messages being retrieved, as follows.

USER
   aAzZbByYcCxX1d2W3E4vAAAAAAAAAAzzzz
PASS aAzZbByYcCxX1d2W3E4vAAAAAAAAAAzzzz
NOOP
   aAzZbByYcCxX1d2W3E4vAAAAAAAAAAzzzz
BADCMD
   aAzZbByYcCxX1d2W3E4vAAAAAAAAAAzzzz In the last case, the POP3 server should respond negatively to the bad command, and not crash. In the return traffic, the timestamp signature 40 may be embedded in the e-mail being transferred, or can be used in the response statement, as follows:

+OK aAzZbByYcCxX1d2W3E4vAAAAAAAAAAzzzz

For the IMAP4 protocol, the timestamp signature 40 may be embedded in a fake Kerberos authorization:

S: * OK KerberosV4 IMAP4 Server–aAzZbByYcCxX1d2W3E4vAAAAAAAAAAzzzz
C: A001 AUTHENTICATE KERBEROS_V4
S: +AmFYig=aAzZbByYcCxX1d2W3E4vAAAAAAA AAAzzzz
C: aAzZbByYcCxX1d2W3E4vAAAAAAAAAAzzzz 3/IJmrMG+25a4DT
+ nZImJjnTNHJUtxAA+o0KPKfHEcAFs9a3CL5Oebe/ ydHJUwYFd
WwuQ1MWiy6IesKvjL5rL9WjXUb9MwT9bpObYL GOKi1Qh
S: + or//
EoAADZIaAzZbByYcCxX1d2W3E4vAAAAAAA AAAzzzz=
C: aAzZbByYcCxX1d2W3E4vAAAAAAAAAAzzzz==
S: A001 OK Kerberos V4 authentication successful–aAzZbByYcCxX1d2W3E4vAAAAAAAAAAzzzz The timestamp signature 40 may further be embedded in the data that is retrieved. Furthermore, timestamp signature 40 may be embedded in SELECT EXAMINE CREATE and DELETE messages for this protocol.

For the Telnet protocol, the timestamp signature 40 is readily embedded in this protocol, since the test instrument has control of the data streams in both directions. For example, the timestamp signature 40 may be embedded in user and login strings, and sent back and forth between the client and server, as follows:

Login:
   aAzZbByYcCxX1d2W3E4vAAAAAAAAAAzzzz
Password:
   aAzZbByYcCxX1d2W3E4vAAAAAAAAAAzzzz
Data
Client:
   aAzZbByYcCxX1d2W3E4vAAAAAAAAAAzzzz
Server:
   aAzZbByYcCxX1d2W3E4vAAAAAAAAAAzzzz For the DNS protocol, in DNS queries, the timestamp signature 40 may be embedded as part of the domain name, as follows:
DNS A-type query for:
www.aAzZbByYcCxX1d2W3E4vAAAAAAAAAA zzzz.com In DNS replies, the timestamp signature 40 may be embedded in the TXT RDATA field.

For streaming protocols (MMS RTSP/RTP) the timestamp signature 40 may be embedded in the binary data section. For the RTSP protocol, the timestamp signature 40 may be embedded similarly as for the HTTP protocol. For P2P and IM protocols, the timestamp signature 40 may be embedded inside the data and message payload.

It is to be understood that the present invention as hereinabove described is not limited to the ISO/OSI model for a protocol stack, but that such model provides a reference for the description and definition of the protocol layers for purposes of the present disclosure, and that principles of the present invention are equally applicable to other such networking models and protocols or names for protocols as defined in such models. For example, another popular model defines four layers wherein its upper fourth layer is generally equivalent to Layers 5-7 of the ISO/OSI model and its lowest first layer generally equivalent to Layers 1-2 of the ISO/OSI model. Its third and second layers are generally equivalent to Layer 4 and Layer 3, respectively, of the ISO/OSI model. Any timestamp signature embedded into the packet during processing at the upper fourth layer, wherein an error detection code for the packet upon is inserted upon encapsulation during processing at either of the third or second layer, with the timestamp signature modified with timestamp information at the lowest first layer responsible for transmission of the frame containing the packet is within the scope of the present invention.

There have been described hereinabove novel methods and apparatus for placing a timestamp in a frame. Those skilled in the art may now make numerous uses of, and departures from, the hereinabove described embodiments without departing from the inventive concepts disclosed herein. Accordingly, the present invention is to be defined solely by the lawfully permitted scope of the appended claims.

What is claimed as the invention is:

1. A method of placing timestamp information in a frame, said frame including a first portion and a second portion wherein said first portion is contained within said second portion and wherein said first portion is processable at a selected protocol layer of a protocol stack and said second portion is processable subsequently thereto at a lower protocol layer of said protocol stack at which a numerically computed error detection code for said second portion is computed, said method comprising steps of:
    embedding a timestamp signature in said first portion during processing thereof at said selected protocol layer, said timestamp signature having a timestamp subfield of initialized data and a corrector subfield of initialized data wherein a numerical constant functionally equivalent to said numerically computed error detection code is determinable from said initialized data in said timestamp subfield and said corrector subfield;
    modifying said data in said timestamp subfield with said timestamp information wherein said timestamp subfield modifying step is performed subsequently to processing of said second portion at said lower protocol layer; and
    modifying said data in said corrector subfield subsequently to said timestamp subfield modifying step such that said numerical constant as determinable from said modified data in said timestamp subfield and said corrector subfield remains unchanged whereby said numerically computed error detection code computed at said lower protocol layer remains valid.

2. A method as set forth in claim 1 wherein said initialized data in said timestamp subfield is a character string.

3. A method as set forth in claim 2 wherein said character string is a string of ASCII characters.

4. A method as set forth in claim 3 wherein said ASCII characters are selected from base64 alphabet characters.

5. A method as set forth in claim 3 wherein said string of ASCII characters includes an identical one of said ASCII characters for each of said ASCII characters in said string.

6. A method as set forth in claim 2 wherein said string has a length selected commensurately with a width of an n-bit wide timestamp counter from which said timestamp is obtained.

7. A method as set forth in claim 1 wherein said initialized data in said corrector subfield is a character string.

8. A method as set forth in claim 7 wherein said character string is a string of ASCII characters.

9. A method as set forth in claim 8 wherein said ASCII characters are selected from base64 alphabet characters.

10. A method as set forth in claim 8 wherein said string of ASCII characters includes an identical one of said ASCII characters for each of said ASCII characters in said string.

11. A method as set forth in claim 7 wherein said string has an initial length that remains constant subsequently to said data in said corrector subfield being modified.

12. A method as set forth in claim 1 wherein said timestamp signature further has a preamble subfield of predetermined data to identify said timestamp signature in said first portion.

13. A method as set forth in claim 12 wherein said predetermined data is a character string.

14. A method as set forth in claim 13 wherein said character string is a string of ASCII characters in said preamble subfield.

15. A method as set forth in claim 14 wherein said ASCII characters are selected from base64 alphabet characters.

16. A method as set forth in claim 14 wherein each of said ASCII characters in said string is uniquely different from each other of said ASCII characters in said string.

17. A method as set forth in claim 13 wherein said string of ASCII characters in said preamble subfield has a length selected to mitigate unintentional coincidence with any other character string in said frame.

18. A method as set forth in claim 12 wherein said predetermined data is obtained from a RAM lookup process.

19. A method as set forth in claim 12 further comprising the step of detecting said predetermined data in said preamble subfield upon imminent transmission of said frame to locate said timestamp subfield, said timestamp subfield modifying step being performed subsequently to detection of said predetermined data.

20. A method as set forth in claim 19 wherein said frame further includes a frame check sequence appended to said frame subsequently to performance of said corrector subfield modifying step.

21. A method as set forth in claim 1 wherein said timestamp subfield modifying step includes the steps of:
    obtaining in a binary form said timestamp information from a timestamp counter; and
    adding said binary form of said timestamp information to a binary form of said initialized data in said timestamp subfield, said modified data in said timestamp subfield being resultant from said adding step.

22. A method as set forth in claim 21 wherein each set of four bits of said binary form of said timestamp information is summed with a corresponding set of four bits of said binary form of said initialized data in said timestamp subfield.

23. A method as set forth in claim 1 wherein said corrector subfield modifying step includes the step of querying a lookup table using said modified data in said timestamp subfield to obtain said modified data for said corrector subfield.

24. A method as set forth in claim 1 wherein said timestamp subfield modifying step is performed upon imminent transmission of said frame.

25. A method as set forth in claim 24 wherein said frame further includes a frame check sequence appended to said frame subsequently to performance of said corrector subfield modifying step.

26. A method as set forth in claim 1 wherein said numerically computed error detection code is a checksum and further wherein said numerical constant is functionally equivalent to a checksum of said timestamp subfield and said corrector subfield.

27. A method of placing timestamp information in a frame, said frame including an ASCII message portion and a transport layer portion wherein said ASCII message portion is contained within said transport layer portion and wherein said ASCII message portion is processable at an application layer of a protocol stack and said transport layer portion is processable subsequently thereto at a transport layer of said protocol stack at which a numerically computed error detection code for said transport layer portion is computed, said method comprising steps of:
    embedding a timestamp signature in said ASCII message portion during processing thereof at said application layer, said timestamp signature having a timestamp subfield containing a first string of initialized ASCII characters and a corrector subfield containing a second string of initialized ASCII characters wherein a numerical constant functionally equivalent to said numerically computed error detection code is determinable from said initialized ASCII characters in said timestamp subfield and said corrector subfield;

modifying said ASCII characters in said timestamp subfield with said timestamp information wherein said timestamp subfield modifying step is performed subsequently to processing of said transport layer portion at said transport layer; and modifying said ASCII characters in said corrector subfield subsequently to said timestamp subfield modifying step such that said numerical constant as determinable from said modified ASCII characters in said timestamp subfield and said corrector subfield remains unchanged whereby said numerically computed error detection code computed at said transport layer remains valid.

28. A method as set forth in claim 27 wherein said timestamp signature is embedded in a header of an HTTP request wherein said header is preceded by predetermined indicia characters.

29. A method as set forth in claim 27 wherein said timestamp signature is embedded in a URL of an HTTP request.

30. A method as set forth in claim 27 wherein said timestamp signature is embedded in a User-Agent header of an HTTP request.

31. A method as set forth in claim 27 wherein said timestamp signature is embedded in a variable name of a URL encoded HTTP Post.

32. A method as set forth in claim 27 wherein said timestamp signature is embedded in a base64 message of a multipart MIME encoded post.

33. A method as set forth in claim 27 wherein said timestamp signature is embedded in the body of an HTTP response.

34. A method as set forth in claim 27 wherein said timestamp signature is embedded in a filename contained within one of a FTP get and a FTP put.

35. A method as set forth in claim 27 wherein said timestamp signature is embedded in a numeric status code of a FTP response.

36. A method as set forth in claim 27 wherein said timestamp signature is embedded in transferred data of a FTP data connection.

37. A method as set forth in claim 27 wherein said timestamp signature is embedded in a SMTP user name of one of a MAIL FROM and a RCPT TO message.

38. A method as set forth in claim 27 wherein said timestamp signature is embedded in a numeric return code of a SMTP response.

39. A method as set forth in claim 27 wherein said timestamp signature is embedded in a selected one of USER, PASS, NOOP and BADCMD of POP3 request.

40. A method as set forth in claim 27 wherein said timestamp signature is embedded in an email returned by a POP3 server.

41. A method as set forth in claim 27 wherein said timestamp signature is embedded in a POP3 response statement.

42. A method as set forth in claim 27 wherein said timestamp signature is embedded in a Kerberos authorization of an IMAP4 protocol.

43. A method as set forth in claim 27 wherein said timestamp signature is embedded in retrieved data of an IMAP4 protocol.

44. A method as set forth in claim 27 wherein said timestamp signature is embedded in a selected one of SELECT, EXAMINE, CREATE and DELETE messages of an IMAP4 protocol.

45. A method as set forth in claim 27 wherein said timestamp signature is embedded in one of Login and Password fields of a Telnet protocol.

46. A method as set forth in claim 27 wherein said timestamp signature is embedded in one of client messages and server messages exchanged between a client and server in a Telnet protocol connection.

47. A method as set forth in claim 27 wherein said timestamp signature is embedded in a domain name portion of DNS query.

48. A method as set forth in claim 27 wherein said timestamp signature is embedded in a TXT RDATA field of a DNS reply.

49. A method as set forth in claim 27 wherein said timestamp signature is embedded in a binary data section of a streaming protocol.

50. A method as set forth in claim 27 wherein said timestamp signature is embedded in one of a data and message payload in one of a P2P and IM protocol.

51. A method as set forth in claim 27 wherein said timestamp signature is embedded in a header of RTP request wherein said header is preceded by predetermined indicia characters.

52. A method as set forth in claim 27 wherein said timestamp signature is embedded in a URL of a RTP request.

53. A method as set forth in claim 27 wherein said timestamp signature is embedded in a User-Agent header of a RTP request.

54. A method as set forth in claim 27 wherein said timestamp signature is embedded in the body of a RTP response.

55. A method as set forth in claim 27 wherein said ASCII characters in said first string are selected from base64 alphabet characters.

56. A method as set forth in claim 27 wherein said first string of ASCII characters includes an identical one of said ASCII characters for each of said ASCII characters in said first string.

57. A method as set forth in claim 27 wherein said first string has a length selected commensurately with a width of an n-bit wide timestamp counter from which said timestamp information is obtained.

58. A method as set forth in claim 27 wherein said ASCII characters in said second string are selected from base64 alphabet characters.

59. A method as set forth in claim 27 wherein said second string of ASCII characters includes an identical one of said ASCII characters for each of said ASCII characters in said second string.

60. A method as set forth in claim 27 wherein said second string has an initial length that remains constant subsequently to said ASCII characters in said corrector subfield being modified.

61. A method as set forth in claim 27 wherein said timestamp signature further has a preamble subfield containing a string of predetermined ASCII characters to identify said timestamp signature in said ASCII message portion of said frame.

62. A method as set forth in claim 61 wherein said predetermined ASCII characters are selected from base64 alphabet characters.

63. A method as set forth in claim 61 wherein each of said predetermined ASCII characters is uniquely different from each other of said predetermined ASCII characters.

64. A method as set forth in claim 61 wherein said string of predetermined ASCII characters in said preamble subfield has a length selected to mitigate unintentional coincidence with any other character string in said frame.

65. A method as set forth in claim 61 wherein said string of predetermined ASCII characters is obtained from a RAM lookup process.

66. A method as set forth in claim 61 further comprising the step of detecting said predetermined ASCII characters in said preamble subfield upon imminent transmission of said frame to locate said timestamp subfield, said timestamp subfield modifying step being performed subsequently to detection of said predetermined ASCII characters.

67. A method as set forth in claim 66 wherein said frame further includes a frame check sequence appended to said frame subsequently to said corrector subfield modifying step.

68. A method as set forth in claim 27 wherein said timestamp subfield modifying step includes the steps of:
  obtaining in a binary form said timestamp information from a timestamp counter; and
  adding said binary form of said timestamp information to a binary form of said initialized ASCII characters in said timestamp subfield, said modified ASCII characters in said timestamp subfield being resultant from said adding step.

69. A method as set forth in claim 68 wherein each set of four bits of said binary form of said timestamp information is summed with a corresponding set of four bits of said binary form of said initialized ASCII characters in said timestamp subfield.

70. A method as set forth in claim 27 wherein said corrector subfield modifying step includes the step of querying a lookup table using said modified ASCII characters in said timestamp subfield to obtain said modified ASCII characters for said corrector subfield.

71. A method as set forth in claim 27 wherein said timestamp subfield modifying step is performed upon imminent transmission of said frame.

72. A method as set forth in claim 71 wherein said frame further includes a frame check sequence appended to said frame subsequently to said corrector subfield modifying step.

73. A method as set forth in claim 27 wherein said numerically computed error detection code is a checksum and further wherein said numerical constant is functionally equivalent to a checksum of said timestamp subfield and said corrector subfield.

74. A method of placing timestamp information in a frame to be transmitted by a transmitting device and received by a receiving device wherein said timestamp information is utilizable at said receiving device, said frame including a first portion and a second portion wherein said first portion is contained within said second portion and wherein said first portion is processable at said transmitting device at a selected protocol layer of a protocol stack in said transmitting device and said second portion is processable at said transmitting device subsequently thereto at a lower protocol layer of said protocol stack at which a numerically computed error detection code for said second portion is computed, said method comprising steps of:
  embedding a timestamp signature in said first portion during processing thereof at said selected protocol layer, said timestamp signature having a timestamp subfield of initialized data and a corrector subfield of initialized data wherein a numerical constant functionally equivalent to said numerically computed error detection code is determinable from said initialized data in said timestamp subfield and said corrector subfield;
  modifying at said transmitting device said data in said timestamp subfield with said timestamp information wherein said timestamp subfield modifying step is performed subsequently to processing of said second portion at said lower protocol layer;
  modifying at said transmitting device said data in said corrector subfield subsequently to said timestamp subfield modifying step such that said numerical constant as determinable from said modified data in said timestamp subfield and said corrector subfield remains unchanged whereby said numerically computed error detection code computed at said lower protocol layer remains valid; and
  extracting at said receiving device said timestamp information by removing from said modified data in said timestamp subfield an influence of said initialized data in said timestamp subfield.

75. A method as set forth in claim 74 wherein said extracting step includes the step of subtracting a binary form of said initialized data originally in said timestamp subfield from a binary form of said modified data in said timestamp subfield, said extracted timestamp information being resultant of said subtracting step.

76. A method as set forth in claim 75 wherein each set of four bits of said binary form of said initialized data originally in said timestamp subfield is subtracted from each corresponding set of four bits of said binary form of said modified data in said timestamp subfield.

77. A method as set forth in claim 76 wherein each set of four bits of said binary form of each of said initialized data and said modified data represent a respective one of an ASCII character.

78. A method as set in claim 74 wherein said extracting step is performed during processing of said first portion at said selected protocol layer of a protocol stack in said receiving device.

79. A method as set forth in claim 74 wherein said extracting step is performed upon receipt of said frame at said receiving device.

80. A method as set forth in claim 74 further comprising the step of detecting at said receiving device predetermined data in a preamble subfield of said timestamp signature, said predetermined data identifying said timestamp signature in said first portion to locate said timestamp subfield, said extracting step being performed subsequently to said predetermined data being detected.

81. A method as set forth in claim 80 wherein said detecting step is performed as said frame is being received by said receiving device.

82. A method as set forth in claim 80 wherein said detecting step is performed during processing of said first portion at said selected protocol layer in a protocol stack in said receiving device.

83. A method as set forth in claim 80 wherein said detecting step includes the step of verifying said timestamp signature from a computation of said numerical constant for said modified data in said timestamp subfield and said corrector subfield.

84. A method of placing timestamp information in a frame to be transmitted by a transmitting device and received by a receiving device wherein said tirnestamp information is utilizable at a receiving device, said frame including an ASCII message portion and a transport layer portion wherein said ASCII message portion is contained within said transport layer portion and wherein said ASCII message portion is processable at said transmitting device at an application layer of a protocol stack in said transmitting device and said transport layer portion is processable at said transmitting device subsequently thereto at a transport layer of said protocol stack at which a numerically computed error detection code for said transport layer portion is computed, said method comprising steps of:

embedding a timestamp signature in said ASCII message portion during processing thereof at said application layer, said timestamp signature having a timestamp subfield containing a first string of initialized ASCII characters and a corrector subfield containing a second string of initialized ASCII characters wherein a numerical constant functionally equivalent to said numerically computed error detection code is determinable from said initialized ASCII characters in said timestamp subfield and said corrector subfield;

modifying at said transmitting device said ASCII characters in said timestamp subfield with said timestamp information wherein said timestamp subfield modifying step is performed subsequently to processing of said transport layer portion at said transport layer;

modifying at said transmitting device said ASCII characters in said corrector subfield subsequently to said timestamp subfield modifying step such that said numerical constant as determinable from said modified ASCII characters in said timestamp subfield and said corrector subfield remains unchanged whereby said numerically computed error detection code computed at said transport layer remains valid; and extracting at said receiving device said timestamp information by removing from said modified ASCII characters in said timestamp subfield an influence of said initialized ASCII characters in said timestamp subfield.

85. A method as set forth in claim 84 wherein said extracting step includes the step of subtracting a binary form of said initialized ASCII characters originally in said timestamp subfield from a binary form of said modified ASCII characters in said timestamp subfield, said extracted timestamp information being resultant of said subtracting step.

86. A method as set forth in claim 85 wherein each set of four bits of said binary form of said initialized ASCII characters originally in said timestamp subfield is subtracted from each corresponding set of four bits of said binary form of said modified ASCII characters in said timestamp subfield.

87. A method as set forth in claim 86 wherein each set of four bits of said binary form of each of said initialized ASCII characters and said modified ASCII characters represent a respective one of said ASCII characters.

88. A method as set forth in claim 84 wherein said extracting step is performed during processing of said ASCII message portion at said selected protocol layer of a protocol stack in said receiving device.

89. A method as set forth in claim 84 wherein said extracting step is performed upon receipt of said frame at said receiving device.

90. A method as set forth in claim 84 wherein a datagram of said frame is fragmented into a plurality of fragments subsequently to said frame being transmitted by said transmitting device, said fragments being assembled during processing at an internet protocol layer of a protocol stack in said receiving device, and wherein said extracting step is performed subsequently to said fragments being assembled.

91. A method as set forth in claim 90 wherein a received time of said frame at said receiving device is a received time of a last received one of said fragments.

92. A method as set forth in claim 84 further comprising the step of detecting at said receiving device a predetermined string of ASCII characters in a preamble subfield of said timestamp signature, said predetermined ASCII characters identifying said timestamp signature in said ASCII message portion to locate said timestamp subfield, said extracting step being performed subsequently to said predetermined string of ASCII characters being detected.

93. A method as set forth in claim 92 wherein said detecting step is performed as said frame is being received by said receiving device.

94. A method as set forth in claim 92 wherein said detecting step is performed during processing of said ASCII message portion at said application layer in a protocol stack in said receiving device.

95. A method as set forth in claim 92 wherein said detecting step includes the step of verifying said timestamp signature from a computation of said numerical constant for said modified ASCII characters in said timestamp subfield and said corrector subfield.

96. In a transmitting device including a protocol stack having a plurality of protocol layers wherein a frame transmittable by said transmitting device includes a first portion processable at a selected one of said protocol layers and a second portion processable at a lower one of said protocol layers subsequently to said first portion being processed, wherein said first portion is contained within said second portion and wherein said second portion includes an error detection code computed for said second portion during processing of said second portion at said lower one of said protocol layers, an apparatus to place timestamp information into said first portion of said frame subsequently to processing of said second portion comprising:

a first module operable during processing of said first portion of said frame at said selected one of said protocol layers to embed a timestamp signature in said first portion, said timestamp signature including a timestamp subfield of initialized data and a corrector subfield of initialized data wherein a numerical constant functionally equivalent to said error detection code is determinable from said initialized data in said timestamp subfield and said corrector subfield;

a second module operable subsequently to processing of said second portion of said frame at said lower one of said protocol layers to modify said data in said timestamp subfield with timestamp information to result in modified data in said timestamp subfield; and a third module operable subsequently to said data in said timestamp subfield being modified to modify said data in said corrector subfield to result in modified data in said corrector subfield such that said numerical constant as determinable from said modified data in said timestamp subfield and said corrector subfield remains unchanged whereby said error detection code remains valid.

97. An apparatus as set forth in claim 96 wherein said initialized data in said timestamp subfield is a character string.

98. An apparatus as set forth in claim 97 wherein said character string is a string of ASCII characters.

99. An apparatus as set forth in claim 98 wherein said ASCII characters are selected from base64 alphabet characters.

100. An apparatus as set forth in claim 98 wherein said string of ASCII characters includes an identical one of said ASCII characters for each of said ASCII characters in said string.

101. An apparatus as set forth in claim 97 wherein transmitting device further includes a timestamp counter having an n-bit wide width from which said timestamp information is obtained and further wherein said string of ASCII characters has a length commensurate with said width of said timestamp counter.

102. An apparatus as set forth in claim 96 wherein said initialized data in said corrector subfield is a character string.

103. An apparatus as set forth in claim 102 wherein said character string is a string of ASCII characters.

104. An apparatus as set forth in claim 103 wherein said ASCII characters are selected from base64 alphabet characters.

105. An apparatus as set forth in claim 103 wherein said string of ASCII characters includes an identical one of said ASCII characters for each of said ASCII characters in said string.

106. An apparatus as set forth in claim 102 wherein said string has an initial length that remains constant subsequently to said data in said corrector subfield being modified.

107. An apparatus as set forth in claim 96 wherein said timestamp signature further has a preamble subfield of predetermined data to identify said timestamp signature in said first portion.

108. An apparatus as set forth in claim 107 wherein said predetermined data is a character string.

109. An apparatus as set forth in claim 108 wherein said character string is a string of ASCII characters in said preamble subfield.

110. An apparatus as set forth in claim 109 wherein said ASCII characters are selected from base64 alphabet characters.

111. An apparatus as set forth in claim 109 wherein each of said ASCII characters in said string is uniquely different from each other of said ASCII characters in said string.

112. An apparatus as set forth in claim 108 wherein said character string in said preamble subfield has a length selected to mitigate unintentional coincidence with any other character string in said frame.

113. An apparatus as set forth in claim 107 wherein said predetermined data is obtained from a RAM lookup process.

114. An apparatus as set forth in claim 107 further comprising a fourth module operable to detect said predetermined data upon imminent transmission of said frame to locate said timestamp subfield, said second module being operable subsequently to detection of said predetermined data.

115. An apparatus as set forth in claim 114 wherein said frame further includes a frame check sequence appended to said frame subsequently to said third module being operable.

116. An apparatus as set forth in claim 96 wherein said transmitting device further includes a timestamp counter operable to develop a binary form of said timestamp information, wherein said initialized data in said timestamp subfield has a binary form, and wherein said second module is further operable to obtain said binary form of said timestamp information from said timestamp counter and further operable to add said binary form of said timestamp information to said binary form of said initialized data in said timestamp subfield whereby said modified data in said timestamp subfield is resultant.

117. An apparatus as set forth in claim 116 wherein each set of four bits of said binary form of said timestamp information is summed with a corresponding set of four bits of said binary form of said initialized data in said timestamp subfield.

118. An apparatus as set forth in claim 96 wherein said transmitting device further includes a lookup table cross-referencing a set of modified data from said timestamp stamp subfield to a set of modified data for said corrector subfield and wherein third module is further operable to query said lookup table using said modified data in said timestamp subfield to obtain said modified data for said corrector subfield.

119. An apparatus as set forth in claim 96 wherein said second module is operable upon imminent transmission of said frame.

120. An apparatus as set forth in claim 119 wherein said frame further includes a frame check sequence appended to said frame subsequently to said third module being operable.

121. An apparatus as set forth in claim 96 wherein said error detection code is a checksum, said numerical constant being functionally equivalent to a checksum of said timestamp subfield and said corrector subfield.

122. In a transmitting device including a protocol stack having at least an application layer and a transport layer wherein a frame transmittable by said transmitting device includes an ASCII message portion processable at said application layer and a transport layer portion processable at said transport layer subsequently to said ASCII message portion being processed wherein said ASCII message portion is contained within said transport layer portion and further wherein said transport layer portion includes an error detection code computed during processing of said transport layer portion at said transport layer, an apparatus to place timestamp information into said ASCII message portion of said frame subsequently to processing of said transport layer portion comprising:

a first module operable during processing of said ASCII message portion of said frame to embed a timestamp signature in said ASCII message portion of said frame, said timestamp signature including a timestamp subfield containing a first string of initialized ASCII characters and a corrector subfield containing a second string of initialized ASCII characters wherein a numerical constant functionally equivalent to said error detection code is determinable from said initialized ASCII characters in said timestamp subfield and said corrector subfield;

a second module operable subsequently to processing of said transport layer portion at said transport layer to modify said ASCII characters in said timestamp subfield with said timestamp information to result in modified ASCII characters in said timestamp subfield; and a third module operable subsequently to said ASCII characters in said timestamp subfield being modified to modify said ASCII characters in said corrector subfield to result in modified ASCII characters in said corrector subfield such that said numerical constant remains unchanged for said modified ASCII characters in said timestamp subfield and said corrector subfield whereby said error detection code remains valid.

123. An apparatus as set forth in claim 122 wherein said ASCII message portion includes an HTTP request having a header, said timestamp signature being embedded in said header, said header being further preceded by predetermined indicia characters.

124. An apparatus as set forth in claim 122 wherein said ASCII message portion includes an HTTP request having a URL, said timestamp signature being embedded in said URL.

125. An apparatus as set forth in claim 122 wherein said ASCII message portion includes an HTTP request having a User-Agent header, said timestamp signature being embedded in said User-Agent header.

126. An apparatus as set forth in claim 122 wherein said ASCII message portion includes a URL encoded HTTP Post having a variable name, said timestamp signature being embedded in said variable name.

127. An apparatus as set forth in claim 122 wherein said ASCII message portion includes a multipart MIME encoded post having a base64 message, said timestamp signature being embedded in said base64 message.

128. An apparatus as set forth in claim 122 wherein said ASCII message portion includes an HTTP response having a body, said timestamp signature being embed in said body.

129. An apparatus as set forth in claim 122 wherein said ASCII message portion includes one of a FTP get and a FTP put having a filename, said timestamp signature being embedded in said filename.

130. An apparatus as set forth in claim 122 wherein said ASCII message portion includes a FTP response having a numeric status code, said timestamp signature being embedded in said numeric status code.

131. An apparatus as set forth in claim 122 wherein said ASCII message portion includes data transferable in a FTP connection, said timestamp signature being embedded in said data.

132. An apparatus as set forth in claim 122 wherein said ASCII message portion includes one of a MAIL FROM and a RCPT TO message having a SMTP user name, said timestamp signature being embedded in said SMTP user name.

133. An apparatus as set forth in claim 122 wherein said ASCII message portion includes a SMTP response having a numeric return code, said timestamp signature being embedded in said numeric return code.

134. An apparatus as set forth in claim 122 wherein said ASCII message portion includes a POP3 request having a selected one of USER, PASS, NOOP and BADCMD, said timestamp signature being embedded in said selected one of USER, PASS, NOOP and BADCMD.

135. An apparatus as set forth in claim 122 wherein said ASCII message portion includes an email returned by a POP3 server, said timestamp signature being embedded in said email.

136. An apparatus as set forth in claim 122 wherein said ASCII message portion includes a POP3 response statement, said timestamp signature being embedded in said response statement.

137. An apparatus as set forth in claim 122 wherein said ASCII message portion includes a Kerberos authorization of an IMAP4 protocol, said timestamp signature being embedded in said authorization.

138. An apparatus as set forth in claim 122 wherein said ASCII message portion includes retrieved data of an IMAP4 protocol, said timestamp signature being embedded in said retrieved data.

139. An apparatus as set forth in claim 122 wherein said ASCII message portion includes a selected one of SELECT, EXAMINE, CREATE and DELETE messages of an IMAP4 protocol, said timestamp signature being embedded in said selected one of said messages.

140. An apparatus as set forth in claim 122 wherein said ASCII message portion includes one of Login and Password fields of a Telnet protocol, said timestamp signature being embedded in said one of said fields.

141. An apparatus as set forth in claim 122 wherein said ASCII message portion includes one of client messages and server messages exchanged between a client and server in a Telnet protocol connection, said timestamp signature being embedded in one of said messages.

142. An apparatus as set forth in claim 122 wherein said ASCII message portion includes a DNS query having a domain name portion, said timestamp signature being embedded in said domain name portion.

143. An apparatus as set forth in claim 122 wherein said ASCII message portion includes a DNS reply having a TXT RDATA field, said timestamp signature being embedded in said TXT RDATA field.

144. An apparatus as set forth in claim 122 wherein said ASCII message portion includes a binary data section of a streaming protocol, said timestamp signature being embedded in said binary data section.

145. An apparatus as set forth in claim 122 wherein said ASCII message portion includes one of a data and message payload in one of a P2P and IM protocol, said timestamp signature being embedded in said one of said data and said message payload.

146. An apparatus as set forth in claim 122 wherein said ASCII message portion includes a RTP request having a header, said timestamp signature being embedded in said header wherein said header is preceded by predetermined indicia characters.

147. An apparatus as set forth in claim 122 wherein said ASCII message portion includes a RTP request having a URL, said timestamp signature being embedded in said URL.

148. An apparatus as set forth in claim 122 wherein said ASCII message portion includes a RTP request having a User-Agent header, said timestamp signature being embedded in said header.

149. An apparatus as set forth in claim 122 wherein said ASCII message portion includes a RTP response having a body, said timestamp signature being embedded in said body.

150. An apparatus as set forth in claim 122 wherein said ASCII characters in said first string are selected from base64 alphabet characters.

151. An apparatus as set forth in claim 122 wherein said first string of ASCII characters includes an identical one of said ASCII characters for each of said ASCII characters in said first string.

152. An apparatus as set forth in claim 122 wherein transmitting device further includes a timestamp counter having an n-bit wide width from which said timestamp information is obtained and further wherein said first string of ASCII characters has a length commensurate with said width of said timestamp counter.

153. An apparatus as set forth in claim 122 wherein said ASCII characters in said second string are selected from base64 alphabet characters.

154. An apparatus as set forth in claim 122 wherein said second string of ASCII characters includes an identical one of said ASCII characters for each of said ASCII characters in said second string.

155. An apparatus as set forth in claim 122 wherein said second string has an initial length that remains constant subsequently to said ASCII characters in said corrector subfield being modified.

156. An apparatus as set forth in claim 122 wherein said timestamp signature further has a preamble subfield containing a string of predetermined ASCII characters to identify said timestamp signature in said ASCII message portion of said frame.

157. An apparatus as set forth in claim 156 wherein said predetermined ASCII characters are selected from base64 alphabet characters.

158. An apparatus as set forth in claim 157 wherein each of said predetermined ASCII characters is uniquely different from each other of said predetermined ASCII characters.

159. An apparatus as set forth in claim 156 wherein said string of predetermined ASCII characters in said preamble subfield has a length selected to mitigate unintentional coincidence with any other character string in said frame.

160. An apparatus as set forth in claim 156 wherein said string of predetermined ASCII characters is obtained from a RAM lookup process.

161. An apparatus as set forth in claim 156 further comprising a fourth module operable to detect said string of predetermined ASCII characters upon imminent transmission of said frame to locate said timestamp subfield, said second module being operable subsequently to detection of said string of predetermined ASCII characters.

162. An apparatus as set forth in claim 161 wherein said frame further includes a frame check sequence appended to said frame subsequently to said third module being operable.

163. An apparatus as set forth in claim 122 wherein said transmitting device further includes a timestamp counter operable to develop a binary form of said timestamp information, wherein said first string of initialized ASCII characters has a binary form, and wherein said second module is further operable to obtain said binary form of said timestamp information from said timestamp counter and further operable to add said binary form of said timestamp information to said binary form of said first string of initialized ASCII characters in said timestamp subfield such that said modified ASCII characters in said timestamp subfield are resultant.

164. An apparatus as set forth in claim 163 wherein each set of four bits of said binary form of said timestamp information is summed with a corresponding set of four bits of said binary form of said initialized ASCII characters in said timestamp subfield.

165. An apparatus as set forth in claim 122 wherein said transmitting device further includes a lookup table cross-referencing a set of modified ASCII characters from said timestamp subfield to a set of modified characters for said corrector subfield and wherein said third module is further operable to query said lookup table using said modified ASCII characters in said timestamp subfield to obtain said modified ASCII characters for said corrector subfield.

166. An apparatus as set forth in claim 122 wherein said second module is operable upon imminent transmission of said frame by said transmission device.

167. An apparatus as set forth in claim 166 wherein said frame further includes a frame check sequence appended to said frame subsequently to said third module being operable.

168. An apparatus as set forth in claim 122 wherein said error detection code is a checksum, said numerical constant being functionally equivalent to a checksum of said timestamp subfield and said corrector subfield.

169. In a system including a transmitting device and a receiving device wherein said transmitting device includes a protocol stack having a plurality of protocol layers, and wherein a frame transmittable by said transmitting device and receivable by said receiving device includes a first portion processable at a selected one of said protocol layers and a second portion processable at a lower one of said protocol layers subsequently to said first portion being processed wherein said first portion is contained within said second portion and wherein said second portion includes an error detection code computed for said second portion during processing of said second portion at said lower one of said protocol layers, an apparatus at said transmitting device to place timestamp information into said first portion of said frame subsequently to processing of said second portion wherein said timestamp information is utilizable at said receiving device comprising:

a first module operable during processing of said first portion of said frame at said selected one of said protocol layers to embed a timestamp signature in said first portion, said timestamp signature including a timestamp subfield of initialized data and a corrector subfield of initialized data wherein a numerical constant functionally equivalent to said error detection code is determinable from said initialized data in said first and said corrector subfield;

a second module in said transmitting device operable subsequently to processing of said second portion of said frame at said lower one of said protocol layers to modify said data in said timestamp subfield with timestamp information to result in modified data in said timestamp subfield;

a third module in said transmitting device module operable to modify said data in said corrector subfield subsequently to said data in said timestamp subfield being modified to result in modified data in said corrector subfield such that said numerical constant as determinable from said modified data in said first and said corrector subfield remains unchanged whereby said error detection code remains valid; and an extract module in said receiving device operable to extract said timestamp information by removing from said modified data in said timestamp subfield an influence of said initialized data in said timestamp subfield.

170. An apparatus as set forth in claim 169 wherein said extract module is further operable to subtract a binary form of said initialized data originally in said timestamp subfield from a binary form of said modified data in said timestamp subfield to result in said extracted timestamp information.

171. An apparatus as set forth in claim 170 wherein each set of four bits of said binary form of said initialized data originally in said timestamp subfield are subtracted from each corresponding set of four bits of said binary form of said modified data in said timestamp subfield.

172. An apparatus as set forth in claim 171 wherein each set of four bits of said binary form of each of said initialized data and said modified data represent a respective one of an ASCII character.

173. An apparatus as set forth in claim 169 wherein said extract module is operable during processing of said first portion at said selected protocol layer of a protocol stack in said receiving device.

174. An apparatus as set forth in claim 169 wherein said extract module is operable upon receipt of said frame at said receiving device.

175. An apparatus as set forth in claim 169 further comprising a detect module at said receiving device to detect predetermined data in a preamble subfield of said timestamp signature, said predetermined data identifying said timestamp signature in said first portion to locate said timestamp subfield, said extract module being operable subsequently to said predetermined data being detected.

176. An apparatus as set forth in claim 175 wherein said detect module is operable as said frame is being received by said receiving device.

177. An apparatus as set forth in claim 175 wherein said detect module is operable during processing of said first portion at said selected protocol layer in a protocol stack in said receiving device.

178. An apparatus as set forth in claim 175 wherein said detect module is further operable to verify said timestamp signature from a computation of said numerical constant for said modified data in said timestamp subfield and said corrector subfield.

179. In a system including a transmitting device and a receiving device wherein said transmitting device includes a protocol stack having at least an application layer and a transport layer wherein a frame transmittable by said transmitting device includes an ASCII message portion processable at said application layer and a transport layer portion processable at said transport layer subsequently to said ASCII message portion being processed wherein said ASCII message portion is contained within said transport layer portion and wherein said transport layer portion includes an error detection code computed for said transport layer portion during processing of said transport layer portion at said transport layer, an apparatus to place timestamp information into said ASCII message portion of said frame subsequently to processing of said transport layer portion comprising:
- a first module operable during processing of said ASCII message portion of said frame at said application layer to embed a timestamp signature in said ASCII message portion of said frame, said timestamp signature including a timestamp subfield containing a first string of initialized ASCII characters and a corrector subfield containing a second string of initialized ASCII characters wherein a numerical constant functionally equivalent to said error detection code is determinable from said initialized ASCII characters in said first and said corrector subfield;
- a second module in said transmitting device operable subsequently to processing of said transport layer portion at said transport layer to modify said ASCII characters in said timestamp subfield with said timestamp information to result in modified ASCII characters in said timestamp subfield;
- a third module in said transmitting device operable subsequently to said ASCII characters in said timestamp subfield being modified to modify said ASCII characters in said corrector subfield to result in modified ASCII characters in said corrector subfield such that said numerical constant remains unchanged for said modified ASCII characters in said first and said corrector subfield whereby said error detection code remains valid; and
- an extract module at said receiving device operable to extract said timestamp information by removing from said modified ASCII characters in said timestamp subfield an influence of said initialized ASCII characters in said timestamp subfield.

180. An apparatus as set forth in claim 179 wherein said extract module is further operable to subtract a binary form of said initialized ASCII characters originally in said timestamp subfield from a binary form of said modified ASCII characters in said timestamp subfield to result in said extracted timestamp information.

181. An apparatus as set forth in claim 180 wherein each set of four bits of said binary form of said initialized ASCII characters originally in said timestamp subfield are subtracted from each corresponding set of four bits of said binary form of said modified ASCII characters in said timestamp subfield.

182. An apparatus as set forth in claim 181 wherein each set of four bits of said binary form of each of said initialized ASCII characters and said modified ASCII characters represent a respective one of an ASCII character.

183. An apparatus as set forth in claim 179 wherein said extract module is operable during processing of said ASCII message portion at said application layer of a protocol stack in said receiving device.

184. An apparatus as set forth in claim 179 wherein said extract module is operable upon receipt of said frame at said receiving device.

185. An apparatus as set forth in claim 179 wherein a datagram of said frame is fragmented into a plurality of fragments subsequently to said frame being transmitted by said transmitting device, said fragments being assembled during processing at an internet protocol layer of a protocol stack in said receiving device, and wherein said extract module is further operable subsequently to said fragments being assembled.

186. An apparatus as set forth in claim 185 wherein a received time of said frame at said receiving device is a received time of a last received one of said fragments.

187. An apparatus as set forth in claim 179 further comprising a detect module at said receiving device to detect predetermined ASCII characters in a preamble subfield of said timestamp signature, said predetermined ASCII characters identifying said timestamp signature in said first portion to locate said timestamp subfield, said extract module being operable subsequently to said predetermined ASCII characters being detected.

188. An apparatus as set forth in claim 187 wherein said detect module is operable as said frame is being received by said receiving device.

189. An apparatus as set forth in claim 187 wherein said detect module is operable during processing of said ASCII message portion at said application layer in a protocol stack in said receiving device.

190. An apparatus as set forth in claim 187 wherein said detect module is further operable to verify said timestamp signature from a computation of said numerical constant for said modified ASCII characters in said timestamp subfield and said corrector subfield.

* * * * *